US008780112B2

(12) United States Patent
Kontkanen et al.

(10) Patent No.: US 8,780,112 B2
(45) Date of Patent: Jul. 15, 2014

(54) COHERENT OUT-OF-CORE POINT-BASED GLOBAL ILLUMINATION

(75) Inventors: Janne M. Kontkanen, San Francisco, CA (US); Eric Tabellion, Belmont, CA (US); Ryan S. Overbeck, San Francisco, CA (US)

(73) Assignee: Pacific Data Images LLC, Redwood City, CA (US)

( * ) Notice: Subject to any disclaimer, the term of this patent is extended or adjusted under 35 U.S.C. 154(b) by 415 days.

(21) Appl. No.: 13/156,213

(22) Filed: Jun. 8, 2011

(65) Prior Publication Data

US 2012/0313944 A1     Dec. 13, 2012

(51) Int. Cl.
*G06T 15/50* (2011.01)

(52) U.S. Cl.
USPC .......................................................... 345/426

(58) Field of Classification Search
CPC ............... G06F 1/1694; G06F 21/316; G06F 2221/2133; G06F 3/034; G06F 3/04847; G06Q 20/10; G06Q 20/32; G06Q 20/3229; G06Q 20/3278; G06Q 20/40; G06Q 20/401; G06Q 20/4012; G06Q 20/4016; G06Q 20/42; G06T 15/506; G06T 17/005; G06T 1/60; G06T 2210/56
See application file for complete search history.

(56) References Cited

U.S. PATENT DOCUMENTS

| 6,583,787 B1 | 6/2003 | Pfister et al. |
| 7,453,460 B2 | 11/2008 | Keller |
| 7,864,177 B2 | 1/2011 | Bunnell |
| 8,145,586 B2 * | 3/2012 | Choi et al. .................... 706/46 |
| 2008/0143720 A1 | 6/2008 | Elmquist |
| 2009/0244065 A1 | 10/2009 | Storti et al. |

OTHER PUBLICATIONS

Christensen, Per H., "Point-Based Approximate Color Bleeding", Pixar Technical Memo #08-01, 2008, 9 pages.*
Hari Sundar et al., "Bottom Up Construction and 2:1 Balance Refinement of Linear Octrees in Parallel", SIAM Journal of Computer, vol. 30, Issue 5, Aug. 2008, pp. 2675-2708.*
Kontkanen et al., "Auxiliary Material", Coherent Out-of-Core Point-Based GI, 2011, 2 pages.
Budge et al., "Out-of-core Data Management for Path Tracing on Hybrid Resources", Eurographics 2009, vol. 28, No. 2, 2009, 12 pages.
Bunnell, Michael, "Dynamic Ambient Occlusion and Indirect Lighting", Chapter 14. Excerpted from GPU Gems 2, Copyright 2005 by NVIDIA Corporation, 2005, 12 pages.

(Continued)

*Primary Examiner* — Kee M Tung
*Assistant Examiner* — Frank Chen
(74) *Attorney, Agent, or Firm* — Morrison & Foerster LLP

(57) ABSTRACT

A computer-animated scene is shaded by a computing system having an in-core memory and coupled to one or more out-of-core storage devices. The scene is comprised of shading locations on a surface element of an object in the scene. A point cloud representation of the scene is generated. An octree data structure based on the point cloud representation of the scene is generated. To generate the octree data structure, the Morton code for each point in the point cloud representation of the scene is computed. The points are then sorted based on the Morton code, recursively subdivided to find at most a threshold number of nodes, and written to the one or more out-of-core storage devices. The shading locations are then shaded based on the nodes written to the out-of-core storage devices.

23 Claims, 9 Drawing Sheets

(56) References Cited

OTHER PUBLICATIONS

Christensen et al., "Ray Differentials and Multiresolution Geometry Caching for Distribution Ray Tracing in Complex Scenes", Eurographics 2003, vol. 22, No. 3, 2003, 10 pages.
Cignoni et al., "External Memory Management and Simplification of Huge Meshes", 2003, pp. 1-14.
Hennessy et al., "Computer Architecture: A Quantitative Approach, Third Edition", 2003, 126 pages.
Garanzha et al., "Fast Ray Sorting and Breadth-First Packet Traversal for GPU Ray Tracing", Eurographics 2010, vol. 29, No. 2, 2010, 10 pages.
Padron et al., "High Performance Global Illumination on Multi-core Architectures", Parallel, Distributed and Network-based Processing, 2009, 1 page.
Kajiya, James T., "The Rendering Equation", SIGGRAPH, vol. 20, No. 4, Aug. 18-22, 1986, pp. 143-150.
Kim et al., "RACBVHs; Random-Accessible Compressed Bounding Volume Hierarchies" Korea Advanced Institute of Science and Technology, 2009, pp. 1-14.
Ko et al., "Practical Spherical Hormonics Based PRT Methods", Learn Network Inspire, Game Developers Conference, Feb. 18-22, 2008, 81 pages.
Lehtinen et al., "A Meshless Hierarchical Representation for Light Transport", ACM Transaction in Graphics, vol. 27, No. 3, Proceeding SIGGRAPH, 2008, pp. 1-9.
Morton, G. M., "A Computer Oriented Geodetic Data Base and a New Technique in File Sequencing", Mar. 1, 1966, 20 pages.
Kontkanen et al., "Coherent Out-of-Core Point-Based Global Illumination", Eurographics Symposium on Rendering 2011, vol. 30, No. 4, 2011, 8 pages.
Pantaleoni et al., "PantaRay: Fast Ray-traced Occlusion Caching of Massive Scenes", 2010, 10 pages.
Yavuz et al., "Parallelization of render engine for global illumination of graphics scenes", Application of Information and Communication Technologies, Oct. 14-16, 2009, 1 page.
Parker et al., "OptiX: A General Purpose Ray Tracing Engine", 2010, 13 pages.
Pharr et al., "Rendering Complex Scenes with Memory-Coherent Ray Tracing", Proceedings of SIGGRAPH, 1997, pp. 1-8.
Gross et al., "Point-Based Graphics: The Morgan Kaufmann Series in Computer Graphics", Elsevier, 2007, 67 pages.
Cai et al., "Progressive out-of-core compression based on multi-level adaptive octree", VRCIA '06 Proceedings of the 2006 ACM international conference on Virtual reality continuum and its applications, Jun. 14-17, 2006, pp. 83-89.
Ritschel et al., "Micro-Rendering for Scalable, Parallel Final Gathering", 2009, 8 pages.
Salmon et al., "Parallel, Out-of-core methods for N-body Simulation", Proceedings of the Eigth Conference on Parallel Processing for Scientific Computing, SIAM, 1997, pp. 1-11.
Schaefer et al., "Adaptive Vertex Clustring Using Octrees", Nashboro Press, 2003, pp. 1-4.
Shaffer et al., "Optimal Quadtree Construction Algorithms", Computer Vision, Graphics, and Image Processing, vol. 37, 1987, pp. 402-419.
Tabellion et al., "An Approximate Global Illumination System for Computer Generated Films", SIGGRAPH 2004 Proceedings, 2004, pp. 1-8.
Tabellion et al., "Global Illumination Across Industries", Ray Tracing Vs Point Based GI for Animated Films, SIGGRAPH 2010, 55 pages.
Tu et al., "The Etree Library: A System for Manipulatng Large Octrees on Disk", National Science Foundation, Jul. 2003, 47 pages.
Walter et al., "Multidimensional Lightcuts", Program of Computer Graphics & Department of Computer Science, SIGGRAPH. 2006, pp. 1-8.
Ward et al., "Irradiance Gradients", 1992, 17 pages.
Yoon et al., "Cache-Efficient Layouts of Bounding Volume Hierarchies", Eurographics 2008, vol. 25, No. 3, 2006, 10 pages.
Zhou et al., "Data-Parallel Octrees for Surface Reconstruction", IEEE Transactions on Visualization & Computer Graphics, 2010, pp. 1-13.
Sloan et al., "Precomputed Radiance Transfer for Real-Time Rendering in Dynamic, Low-Frequency Lighting Environments", SIGGRAPH '02 Proceedings of the 29th annual conference on Computer graphics and interactive techniques, vol. 21 No. 3, Jul. 2002, 10 pages.
Rusinkiewicz et al., "Streaming QSplat: A Viewer for Networked Visualization of Large, Dense Models", I3D '01 Proceedings of the 2001 symposium on Interactive 3D graphics, 2001, pp. 63-69.
Lauterbach et al., "Fast BVH Construction on GPUs", Eurographics 2009, vol. 28, No. 2, 2009, 10 pages.
Krivanek et al., "Global Illumination Across Industries", Course: SIGGRAPH, 2010, 22 pages.
Fajardo, Marcos, "Ray Tracing Solution for Film Production Rendering", SIGGRAPH, 2010, 41 pages.
Christensen, Per H., "Point-Based Global Illumination for Movie Production", SIGGRAPH 2010 Course Global Illumination Across Industries, Jul. 2010, 21 pages.
Bunnell, Michael, "Adding Real-Time, Point Based Global Illumination to Video Games", 2010, pp. 1-37.
Larsson, David, "Pre-computing Lighting in Games", Autodesk, 2010, pp. 1-33.
Kaplanyan, Anton, "Real-time Diffuse Global Illumination in CryENGINE 3", SIGGRAPH, 2010, pp. 1-41.
Krivanek, Jaroslav, "Conclusions", Global Illumination Across Industries, 2010, pp. 1-6.

* cited by examiner

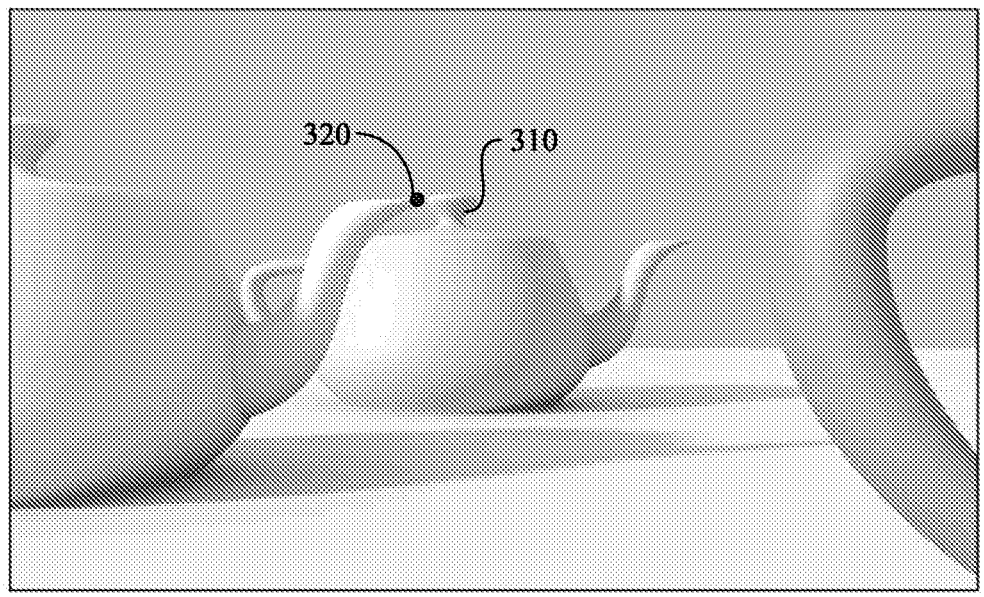
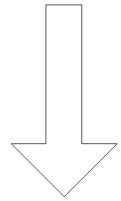
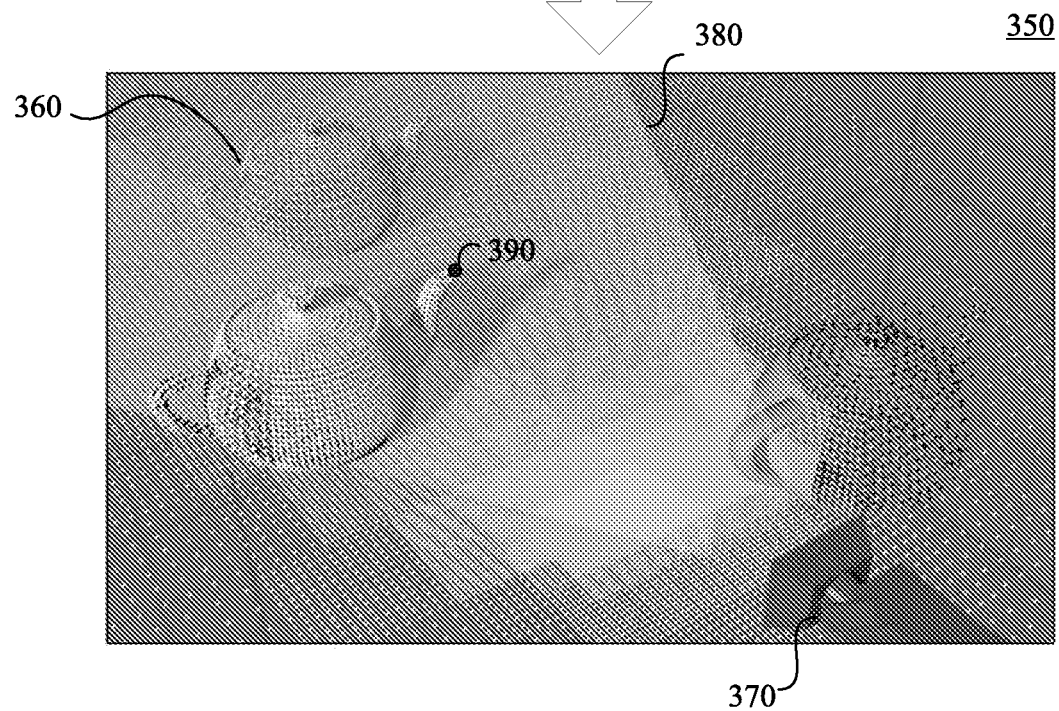
FIG. 3

"CITY" 128.1 MILLION POINTS

"CITY STATIC" 1.737 BILLION POINTS

COHERENT OUT-OF-CORE POINT-BASED GLOBAL ILLUMINATION

BACKGROUND

1. Field

This application relates generally to computer graphics, and more specifically to computer systems and processes for efficiently rendering a scene, using out-of-core point-based global illumination.

2. Related Art

Global illumination is a technique used in computer graphics to add more realistic lighting to the scenes. One global illumination approach is known as the point-based global illumination (PBGI) approach. (See Per H. Christensen, "Point-based approximate color bleeding," *Pixar Technical Memo* #08-01 (July 2008), hereinafter referred to as "Christensen 2008.") PBGI generally involves solving for indirect illumination integrals and occlusion integrals. With PBGI, the directly illuminated geometry in the scene is represented by a point cloud representation, which is generated in a pre-computation phase prior to the rendering of the scene.

A point in a point cloud is a position in three-dimensional space containing energy information. In one example, a point may be a data representation of a surfel, which is a small circular disk-shaped surface element making up the different objects within a scene. As described in Christensen 2008, the surfaces of different objects are subdivided into small micropolygons, and the light energy emitting from each micropolygon (e.g., the radiance) is stored with each point. A point can also store other information, including a position, a surface normal, an effective area, a point-radius, and the like. As described in Christensen 2008, the effective area and the point-radius stored in a point are not the same thing; rather, they are two different representations of the size of the point. The point-radius circumscribes the micropolygon that the point represents. This ensures that the surfaces are completely covered by the points with no gaps in between. The effective area is the point's real area, which is smaller than the area corresponding to the point-radius.

To efficiently solve the illumination integrals with PBGI, the generated point cloud is further organized into a multi-resolution level-of-detail hierarchy. For example, an octree data structure may be used to partition the three-dimensional space represented by a point cloud by recursively subdividing the space into eight octants. An octree data structure is a tree data structure wherein each internal node has up to eight child nodes. Leaf nodes in the octree store the individual points of the point cloud and a point cluster for the volume of space the individual points in the leaf node cover. Each node other than a leaf node stores a point cluster, which is an approximation of a collection of points situated within a particular volume. For example, a point cluster representation includes an average position for the cluster, as well as the projected area and emitted energy when the cluster is viewed from various directions (the directional projected area and directional emitted energy, respectively).

After generating the octree hierarchy, both the full point cloud and the octree hierarchy may then be used to compute the indirect illumination integrals and occlusion integrals at all the "shading locations" seen from a virtual camera. However, not all the nodes of the octree are necessary to compute the integrals at a particular shading location. For example, when an object is far away from a shading location in the scene, less refined nodes of the octree may be used to calculate the various integrals. When an object is close by, more refined nodes or even individual points may be used. However, using more refined nodes to compute the integrals translates to longer shading time.

The octree clustering technique described above reduces the complexity of solving the actual integrals significantly. Nevertheless, the amount of execution time required by the algorithm used to build the octree clustering has a complexity order of at least O(n log n) and the amount of memory required to store the aforementioned data structures has a complexity order of at least O(n), where n is the number of input points in the point cloud. Further, PBGI is used in production to render complex scenes, so storage of the points in the point cloud and octree data structure in main memory (or resident memory on a machine) quickly becomes a constraining factor on the number of points in the point cloud.

Rendered images used in high-quality motion pictures need to be photorealistic. One way to increase photorealism is to increase the number of points in the point cloud. However, as discussed, the number of points is limited by the amount of main (in-core) memory available. Therefore, a technique is required that utilizes constrained amounts of memory, while allowing for increased numbers of points in the point cloud.

SUMMARY

Described herein are a method, system, and apparatus for out-of-core PBGI, which may operate within a user-specified memory cap. Out-of-core PBGI utilizes out-of-core memory, by coherently sorting and storing data on disk compactly for later access during shading. Further, using the property of a space-filling curve, the data may be pre-processed in two passes: a sorting pass and an octree construction pass.

After generating a point cloud construction of a scene, the points in the point cloud may be sorted according to their Morton order. An octree data structure may be constructed for the points in the point cloud. The sorting may allow the octree data structure to be built in a single streaming pass over the points. The points and nodes in the octree data structure may then be written to one or more out-of-core storage devices. During final shading, each shading location may be shaded by performing a depth-first traversal of the octree and choosing a suitable level of detail. As a result of the storage method, portions of the octree not required for shading need not be loaded into main memory, lessening the main memory requirements for shading a scene.

In one exemplary embodiment, a computer-animated scene is shaded using one or more out-of-core storage devices to store an octree data structure. The scene is comprised of shading locations on a surface element of an object in the scene. A point cloud representation of the scene is generated. An octree data structure based on the point cloud representation of the scene is generated. To generate the octree data structure, in one example, a position on a space filling curve is computed for each point in the point cloud representation of the scene. The points are then sorted based on the space filling curve. The point set is recursively subdivided to find at most a threshold number of points, and then the points are written to one or more out-of-core storage devices as nodes. The scene is shaded based on the nodes written to the one or more out-of-core storage devices.

BRIEF DESCRIPTION OF THE FIGURES

The present application can be best understood by reference to the following description taken in conjunction with the accompanying drawing figures, in which like parts may be referred to by like numerals.

FIG. 3 illustrates an exemplary representation of generating a point cloud representation of a scene.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

Figure 1:
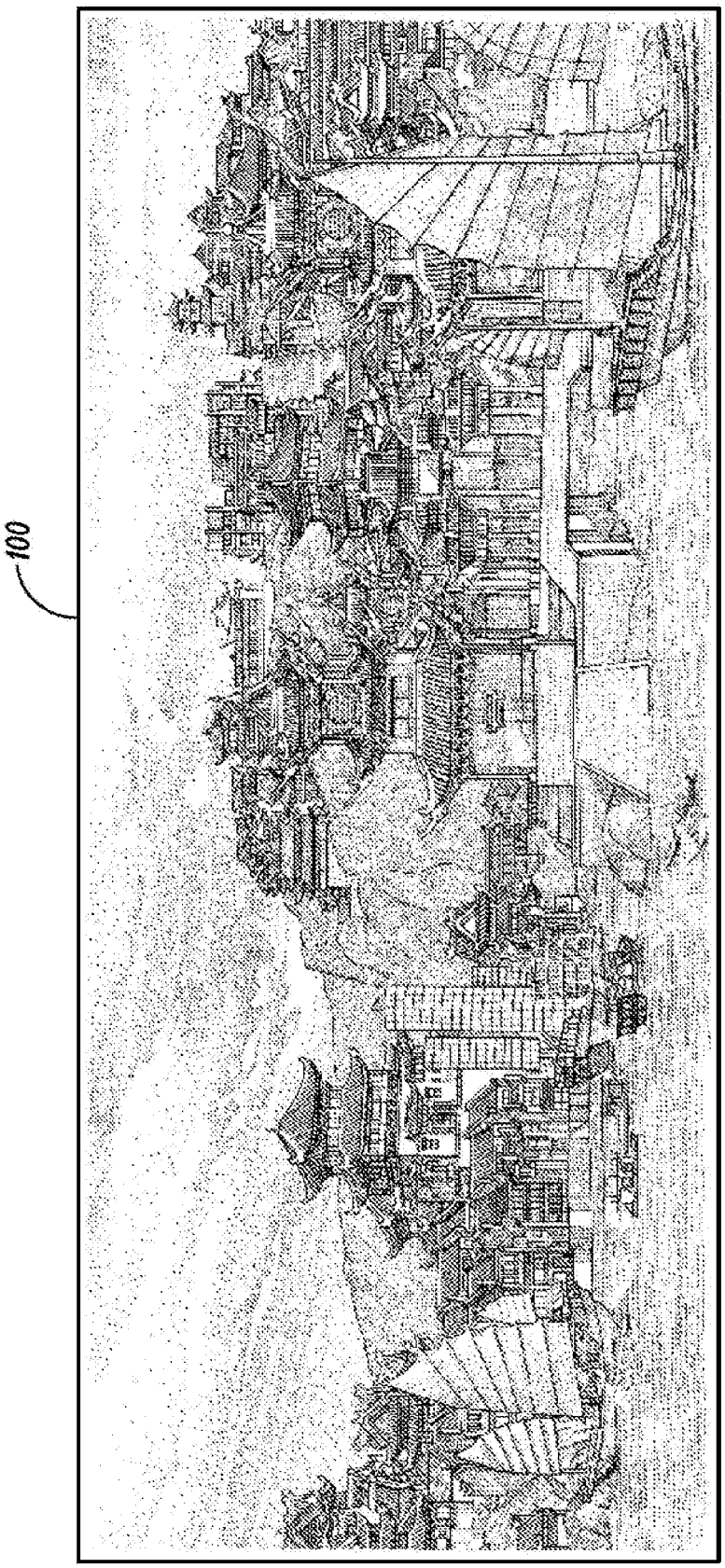
FIG. 1 illustrates an exemplary scene generated using out-of-core PBGI.

FIG. 1 illustrates an exemplary scene 100 rendered using PBGI. To photo-realistically render scene 100, the point cloud may require 927 million points, resulting in an octree with 203 million nodes. These points may occupy 27.6 GB of space, while the octree may require an additional 22.7 GB. To render scenes using the PBGI technique described by Christensen 2008, the entire scene may need to be accessed and located in main (in-core) memory. Today, it is difficult to store over 50 GB of data in main memory. Therefore, scene 100 may instead be generated using out-of-core PBGI. In general, out-of-core processes are designed to process data that are too large to fit into a device's main memory at one time. Instead, they utilize out-of-core storage devices, such as secondary memory, external memory, hard disks, flash, solid-state drives, cloud storage, tape drives, or the like, to efficiently fetch and access the data required for the process.

Figure 2:
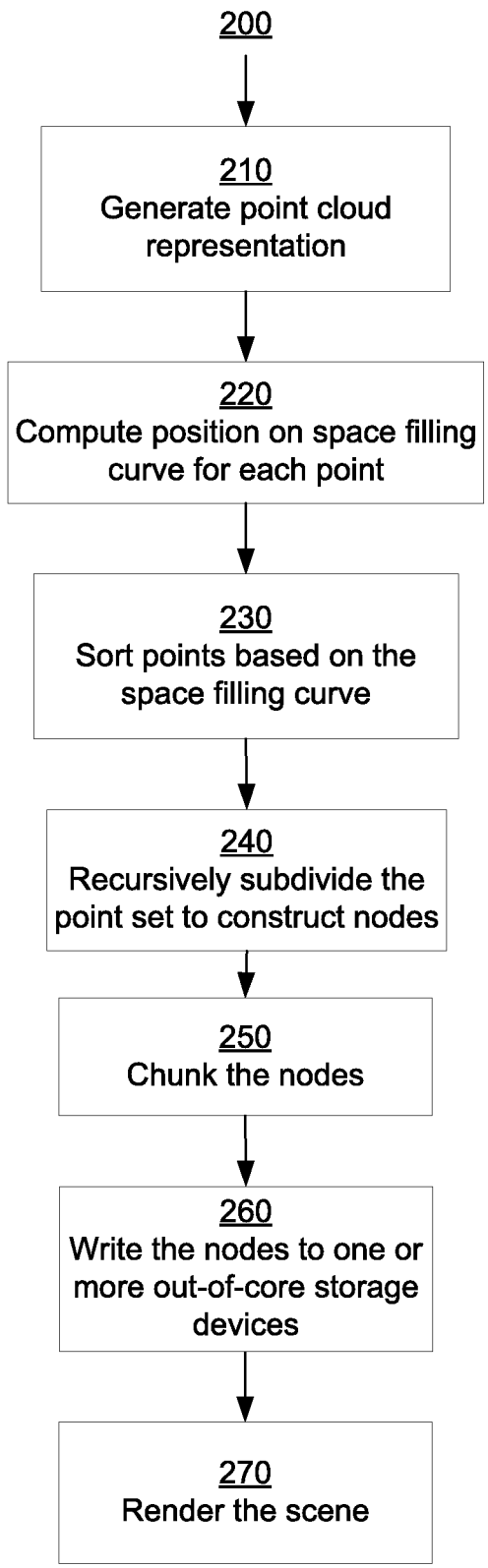
FIG. 2 illustrates an exemplary process for rendering a scene.

FIG. 2 illustrates an exemplary process 200 for rendering a scene using out-of-core PGBI. The process used to generate the scene may be an out-of-core octree build method that requires minimal amounts of input/output (I/O) and stores both the points and the octree nodes coherently on one or more out-of-core storage devices. In step 210 of process 200, a point cloud representation of the scene is generated. A PBGI method, such as, for example, the one described in Christensen 2008, may be used to generate the point cloud.

FIG. 3 provides one exemplary representation of generating a point cloud representation of a scene. Scene 300 may represent a snapshot taken by a virtual camera 370, viewing a virtual world of teapots, including teapot 310. A point cloud representation 360 of teapot 310 may be computed. To generate the point cloud, the surfaces of different objects in the scene 300, such as teapot 310, may be subdivided into small micropolygons. The energy reflected from each micropolygon may be stored as an energy value in a point in the point cloud. A point may also store other information, including a position, a surface normal, an effective area, a point-radius, or the like. Shading location 320 in the scene 300 may correspond to point 390 in the point cloud representation 350 of the scene 300.

The point cloud may be generated from the point of view of the virtual camera's 370 frustrum 380. This limits the number of points to those visible by the camera, removing any points outside the camera's field of view or occluded by other objects within the scene. The point cloud representation 350 of the scene 300 may be generated in a pre-computation phase before computing the shading of the pixels in the scene.

Figure 4:
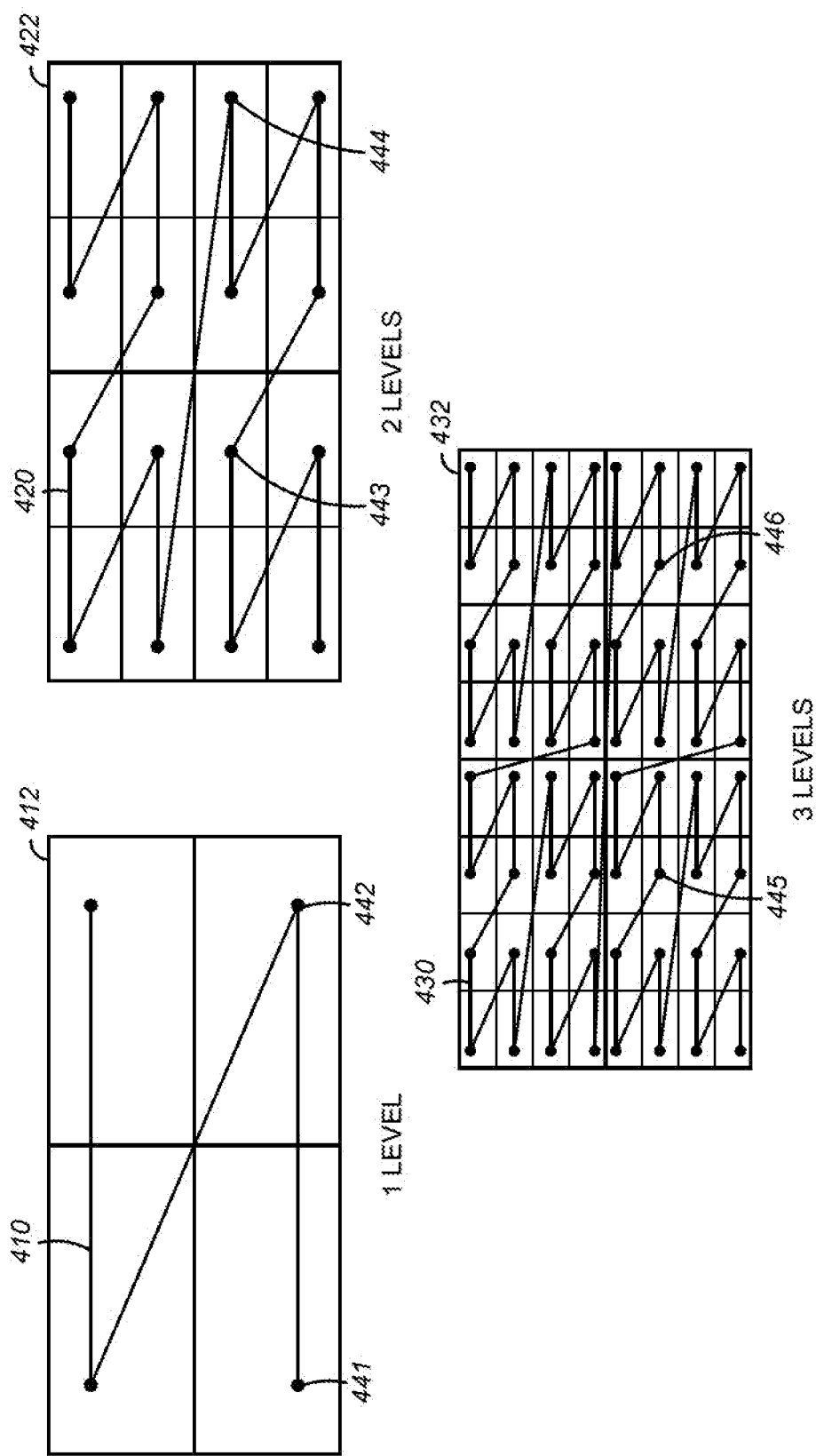
FIG. 4 illustrates an exemplary view of several Z-curves.

Referring again to FIG. 2, in step 220 of process 200, a position on the space filling curve may be computed for each point in the point cloud representation. A space filling curve is a curve whose range contains the entire two-dimensional unit square. In one embodiment, the space filling curve may be a "Z-curve," so named for its "Z" shape. FIG. 4 illustrates three iterations of a Z-curve in two dimensions (2D) and its associated quadtree. Grids 412, 422, and 432 represent the quadtree structure for the Z-curve. Grid 412 has one level and is a single Z 410. Grid 422 has two levels and is 4 Zs 420 arranged in a Z. Grid 432 has three levels and is 16 Zs 430 at the finest resolution.

In this embodiment, the points may be sorted along a Z-curve, based on their Morton order. Morton order may be determined from a point's Morton code. A Morton code maps multidimensional data to one dimension while preserving locality of the points. (Morton 1966.) For example, the Morton code of a point may correspond to its position on a space filling curve such as the Z-curve. The Morton code of a point in multidimensional space may be calculated by interleaving the binary representations of its coordinate values. Once the data are sorted into this ordering, any one-dimensional data structure, such as an array, may be used to coherently store the data. For example, to determine the Morton code for a three-dimensional (3D) point, the floating point 3-vector (storing x, y, and z coordinates as floating points) may be converted into an integer 3-vector (storing x, y, and z coordinates as integers). The bits of the x, y, and z integer coordinates may then be interleaved into a single 64-bit value to compute the Morton code for the 3D point. For example, given 2-bit integer coordinates (X1X0, Y1Y0, Z1Z0), the 6-bit Morton code would be Z1Y1X1Z0Y0X0. One of ordinary skill will recognize that this example is exemplary and other size integers may be used.

The resulting ordering, the Morton order, may be described as the order from a depth-first traversal of a quadtree in 2D, an octree in 3D, or the like. Due to its close connection with quadtrees, octrees, and the like, the Morton ordering may be used to efficiently construct quadtrees, octrees, and related higher dimensional data structures.

Utilizing the property that the Z-curve follows the depth-first traversal (Morton 1966), the PBGI octree may be built in a single streaming pass over the sorted points. Optionally, the octree nodes may be organized into coherent chunks, which may improve the final shading performance. The curve transcribed by connecting points in Morton order is referred to as a Z-curve. The points, such as points 441-446 in FIG. 4, represent the points corresponding to the Morton code integer values along the curve. As can be seen in FIG. 4, the Z-curve may provide a natural one-dimensional (1D) ordering of the 2D quadtree nodes.

The invention is not limited to this embodiment and other space filling curves may be used. For example, the space filling curve may be a Peano-Hilbert curve. See Hilbert 1891.

Referring again to FIG. 2, in step 230 of process 200, the points may be sorted based on the space filling curve. In the embodiment discussed above, the points may be sorted according to their Morton order, following the Z-curve shown in FIG. 4. If the points are sorted according to their Morton order, it may be possible to build an octree and the cluster data in a single streaming pass, in serial order, or the like. The points may be sorted using an out-of-core, or external, sorting method. For example, an N-way merge sort may be used. The N-way merge sort sorts the input into blocks that fit in in-core memory. Then, a merge pass over all of the blocks may be performed. Once the points have been sorted, the octree may be constructed and the clusters may be computed. One of ordinary skill in the art will recognize that other out-of-core, or external, sorting methods may be used, including, but not limited to, two-way merge sort. This sorting may be executed on parallel processors.

Figure 5:
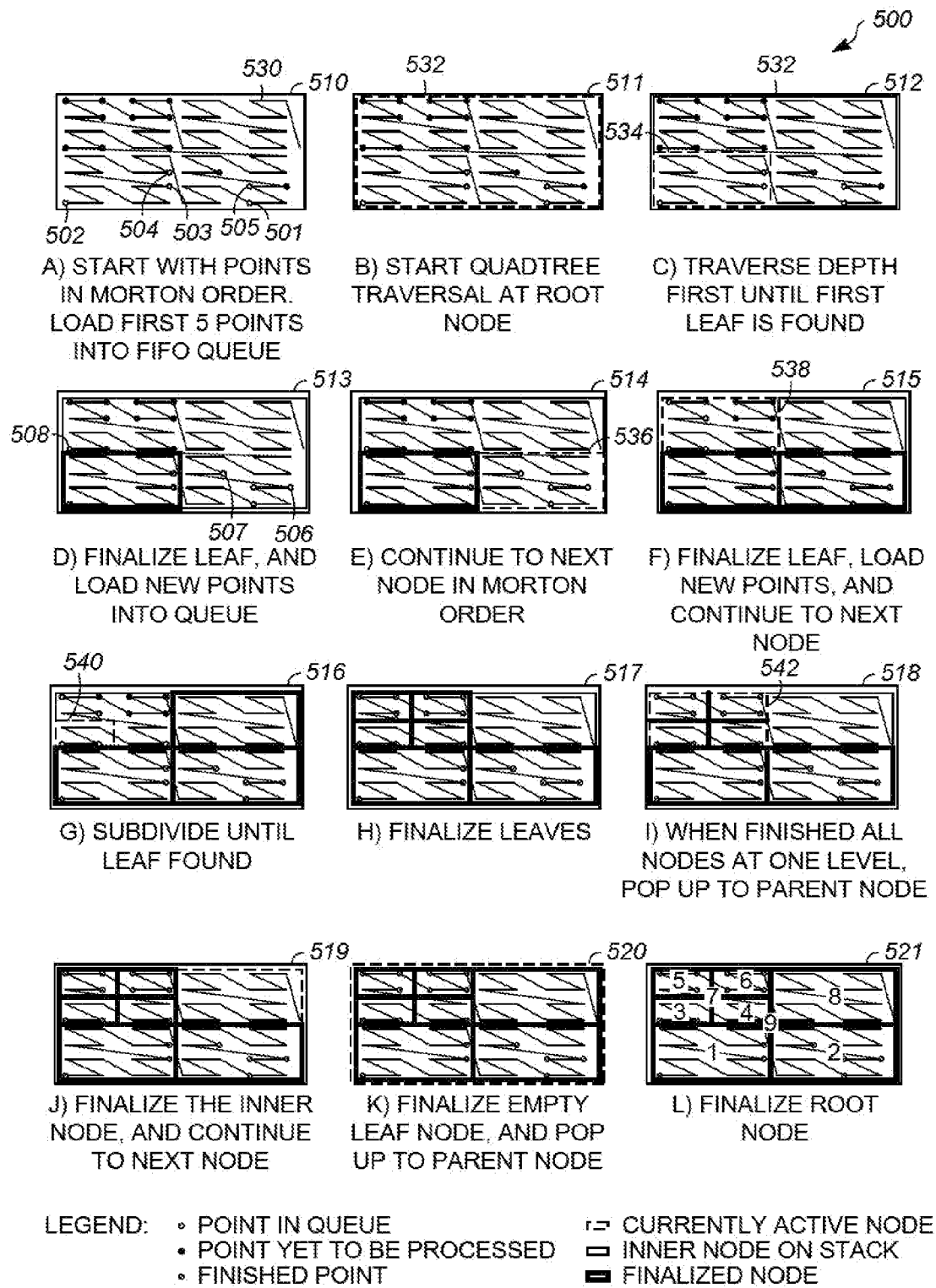
FIG. 5 illustrates an exemplary view for constructing an out-of-core octree.

In step 240 of process 200, the points are grouped and clustered into octree nodes based on their order. The octree may be constructed by performing a recursive depth-first traversal of the implicit structure of the tree. FIG. 5 illustrates an exemplary process for constructing an octree using this method. The nodes may be constructed in post-order, e.g., just before the traversal unwinds the stack to move one level up in the tree. The tree may be built from the bottom up, and each parent node may be constructed after all its child nodes have been constructed. The octree nodes may be written into one or more files.

Each node may be "finalized" before writing the node to an out-of-core storage device. An out-of-core storage device may be secondary memory, external memory, a hard disk, flash, solid-state drive, cloud storage, tape drive, or the like. The nodes may be written to the out-of-core storage device as page files, or fixed length contiguous blocks. Finalizing the node may include computing the cluster data associated with each node. See Christensen 2008. Table 1 provides one exemplary implementation for finalizing a node.

TABLE 1

Node finalization

```
def finalizeInner(node):
    for octant = 0...7 do
        if node.child[octant] != null then
            node.cluster += node.child[octant].cluster
            node.childIdx[octant] = node.child[octant].idx
        else
            node.childIdx[octant] = noIndex
        end
        free(node.child[octant])
    end
def finalizeLeaf(queue, node, pointsProcessed):
    node.firstPoint = pointsProcessed
    node.numPoints =0
    while contains(node, front(pointQueue)) do
        pop(pointQueue)
        pointsProcessed++
        node.numPoints++
    end
    return pointsProcessed
```

At most, a threshold number of points, N, may be stored in each leaf node. In one embodiment, the threshold number of points may be 16. However, the invention is not limited to this embodiment and N may take on any integer value. For example, N may be adjusted to enhance performance of the method. At any time, at most (N+1) points need to be in memory. A first-in first-out (FIFO) queue may be used to store these points.

FIG. 5 presents a 2D representation of constructing a quadtree. One of skill in the art will recognize that the basic method may be extended to three dimensions and the octree data structure. Box 510 shows a set of points and the Z-curve connecting them. In this example, the threshold number of points, N, is 4. However, as discussed above, N may be any integer and 4 is only used for exemplary purposes and ease of illustration.

The first five (N+1) points 501-505 along the Z-curve 530 may be loaded into a queue. Then, in box 511, a depth-first traversal at the root node 532 of the quadtree may be initiated. Since the points are in Morton order, the nodes at the lower left corner of the quadtree may be inspected first.

In box 512, the quadtree may be recursively subdivided until a node 534 that does not contain all of the points in the queue is found. As the quadtree is subdivided, the parent node 532 may be pushed onto a stack. Note that it may be sufficient to test the last point in the queue to see whether all points fit in the node. If the last point is inside the node, then all points in the queue before it are also inside the node. The bottom left node may be accessed next, as this may hold the first point along the Z-curve.

Once a node is found that does not hold the last point in the queue, that node may become a leaf node 534. The node may then be finalized and the points that are in the node's bounds may be extracted from the queue. In box 513, the node may be written to the file, storing the index of the first point and the number of points in the node. Once the leaf node 534 is finalized, its points 501-503 need not be revisited anymore. Finally, more points 506-508 may be loaded to refill the queue.

Next, in box 514, traversal may continue to the sibling 536 that is next in Morton order. If this node holds at most the threshold number of points, N, it may be made a leaf and traversal may continue to the next sibling. Otherwise, the node may be recursively subdivided until a node that holds at most the threshold number of points, N, is found. In this particular example, in box 514, the first sibling 536 has four points which is equal to the threshold number of points (N=4), so it may be made into a leaf node. In box 515, the next sibling 538 in Morton order has more than the threshold number of points, N. Therefore, it is subdivided further into node 540 in box 516.

When a full Z-shape is completed at any level in the quadtree (as shown in box 517), the inner node 542 at that level may be finalized (as shown in box 518). At this point, the cluster attributes for the inner node may be computed from the attributes of its child nodes at box 519, and the inner node may be written out. Once an inner node is finalized, its direct child nodes may be freed from memory.

The method may continue until all points are exhausted and all nodes have been finalized and written to an out-of-core storage device. The numbers in box 521 show one exemplary order in which the nodes may be finalized and written to one or more out-of-core storage devices. These numbers may be used to uniquely identify the nodes.

This exemplary method provides an efficient way to create out-of-core files for the octree nodes. As shown in box 521, the nodes may be stored in the file according to a depth-first traversal. Both node and point files may be implicitly partitioned into constant sized pages. During shading, the frequently used pages may be cached in memory for quick access.

Table 2 provides one exemplary implementation for building the octree using Morton-sorted points.

TABLE 2

A basic streaming octree building implementation for Morton-sorted points

```
Input: pointInStream: Morton-sorted stream of points
Output: nodeOutStream: The output stream for the out-of-core node data
/* The main entry point for the algorithm. We do not repeat this
   part for the second version (Table 3) */
fill(queue, pointInStream)
pointsProcessed =0
root = allocRoot( )
buildRecurse(queue, root)
free(root)
return
def shouldRefine(node, queue):
```

TABLE 2-continued

A basic streaming octree building implementation for Morton-sorted points

```
    a = contains(node, back(queue))
    b = size(queue) > leafMax
    c = isSubdivisible(node)
    return a and b and c
def buildRecurse(queue, node):
    if isEmpty(queue) then
        return
    if !contains(node, front(queue)) then
        return
    if shouldRefine(node, queue) then
        for octant = 0...7 do
            node.child[octant] = allocNode(node, octant)
            buildRecurse(queue, node.child[octant])
        end
        finalizeInner(node)
        node.idx = tell(nodeOutStream)
        write(nodeOutStream, node)
    else
        /* The below while-loop is triggered only if the node was not
           subdivisible, i.e., the max Morton code bit depth was met */
        while contains(node, next(pointInStream)) do
            push(queue, next(pointInStream))
            advance(pointInStream)
        end
        finalizeLeaf(queue, node, pointsProcessed)
        node.idx = tell(nodeOutStream)
        write(nodeOutStream, node)
        fill(queue, pointInStream)
end
```

Returning to FIG. 2, in step 250 of process 200, in one embodiment, the nodes may be chunked. Without chunking, the depth-first order may be relatively incoherent except for a few levels close to the leaves of the tree. In a large tree, the child nodes may not end up near their parents. However, during shading, the child nodes may be accessed soon after their parent. So, in this embodiment, the child nodes may be stored near their parents to increase the probability of them being on the same page in an out-of-core storage device.

Figure 6:
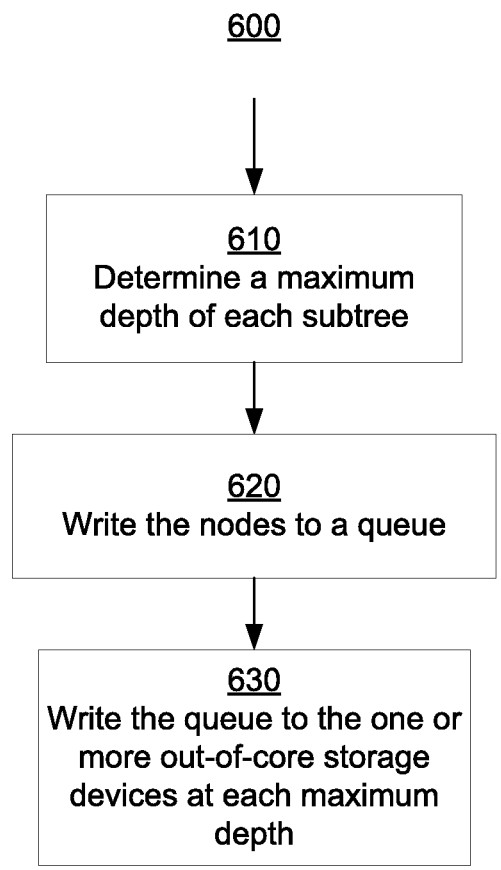
FIG. 6 illustrates an exemplary process for constructing an out-of-core octree with chunking.

A more coherent ordering of the nodes may be achieved with an extension to the basic method, described in conjunction with FIG. 5, by chunking. Chunking may be performed by delaying the output of the nodes, so that chunks of nodes are written at once, resulting in the nodes within each chunk being placed near each other. FIG. 6 illustrates exemplary process for modifying construction an out-of-core octree with chunking.

Chunking may be implemented by augmenting process 200 with write-out queues that may be created and flushed periodically during the build. In step 610 of process 600, a maximum depth of each subtree may be determined. The size of the chunks may be controlled by the "chunk level," a value that determines the maximum depth of each subtree. A chunk level of three may give good cache hit rates. In this embodiment, a queue for any inner node at every third level in the tree will be created. However, other chunk levels may be used. In step 620 of process 600, the chunked data nodes may be written to a queue. Each queue may gather all of the nodes for the subtree below it. In step 630 of process 600, the traversal may return to the inner node that created the queue, and the queue may be written out and deallocated.

Table 3 provides one exemplary implementation for out-of-core octree construction with chunking. The implementation in Table 3 is bootstrapped the same way as the non-chunked implementation in Table 2, so that code is not repeated here.

TABLE 3

An out-of-core octree construction implementation with chunking

```
def buildRecurse2(queue, node):
    if isEmpty(queue) then
        return
    if !contains(node, front(queue)) then
        return
    if level(node) % chunk_levels = 0 then
        writeOutQueue = allocQueue( );
    if shouldRefine(node, queue) then
        for octant = 0...7 do
            node.child[octant] = allocNode(node, octant)
            buildRecurse2(queue, node.child[octant])
        end
    else
        /* The below while-loop is triggered only if the node was not
           subdivisible, i.e., the max Morton code bit depth was met */
        while contains(node, next(pointInStream)) do
            push(queue, next(pointInStream))
            advance(pointInStream)
        end
        finalizeLeaf(queue, node, pointsProcessed)
        fill(queue, pointInStream)
    end
    push(writeOutQueue, node)
    if level(node) % chunk_levels = 0 then
        while isEmpty(writeOutQueue) do
            wnode = front(writeOutQueue)
            if !isLeaf(wnode) then
                finalizeInner(wnode)
            wnode.idx = tell(nodeOutStream)
            write(nodesOutStream, wnode)
            pop(writeOutQueue)
        end
        free(writeOutQueue)
    end
```

Table 4 provides various utility functions and constants used in Tables 2 and 3, with additional explanation.

TABLE 4

Various utility functions and constants used in Tables 2-3

```
def advance(stream): /* move read/write head forward */
def allocRoot( ): /* Create the root node */
def allocNode(node, oct): /* Create a child in a specific octant */
def allocQueue( ): /* Create a queue */
def back(queue): /* Get the item in the back of the queue */
def contains(node, point): /* Is point inside the node? */
def fill(queue, instream): /* Fill the queue with leaf_max+1 pts */
def free(item): /* Deallocates the item from memory */
def front(queue): /* Get the item at the front of the queue */
def isEmpty(queue): /* Check if the queue is empty */
def isSubdivisible(node): /* Not yet at max. Morton bit depth? */
def level(node): /* The depth of the node in the tree */
def next(stream): /* Read the next item from the stream */
def pop(queue): /* Remove an element from the queue */
def push(queue, item): /* Deposit item to the back of the queue */
def tell(stream): /* Get write/read head location */
def write(stream, item): /* Write an item into the stream */
def chunk_levels = 3: /* Subtree depth for chunking */
def leaf_max = 16: /* The refinement criteria */
```

Figure 7:
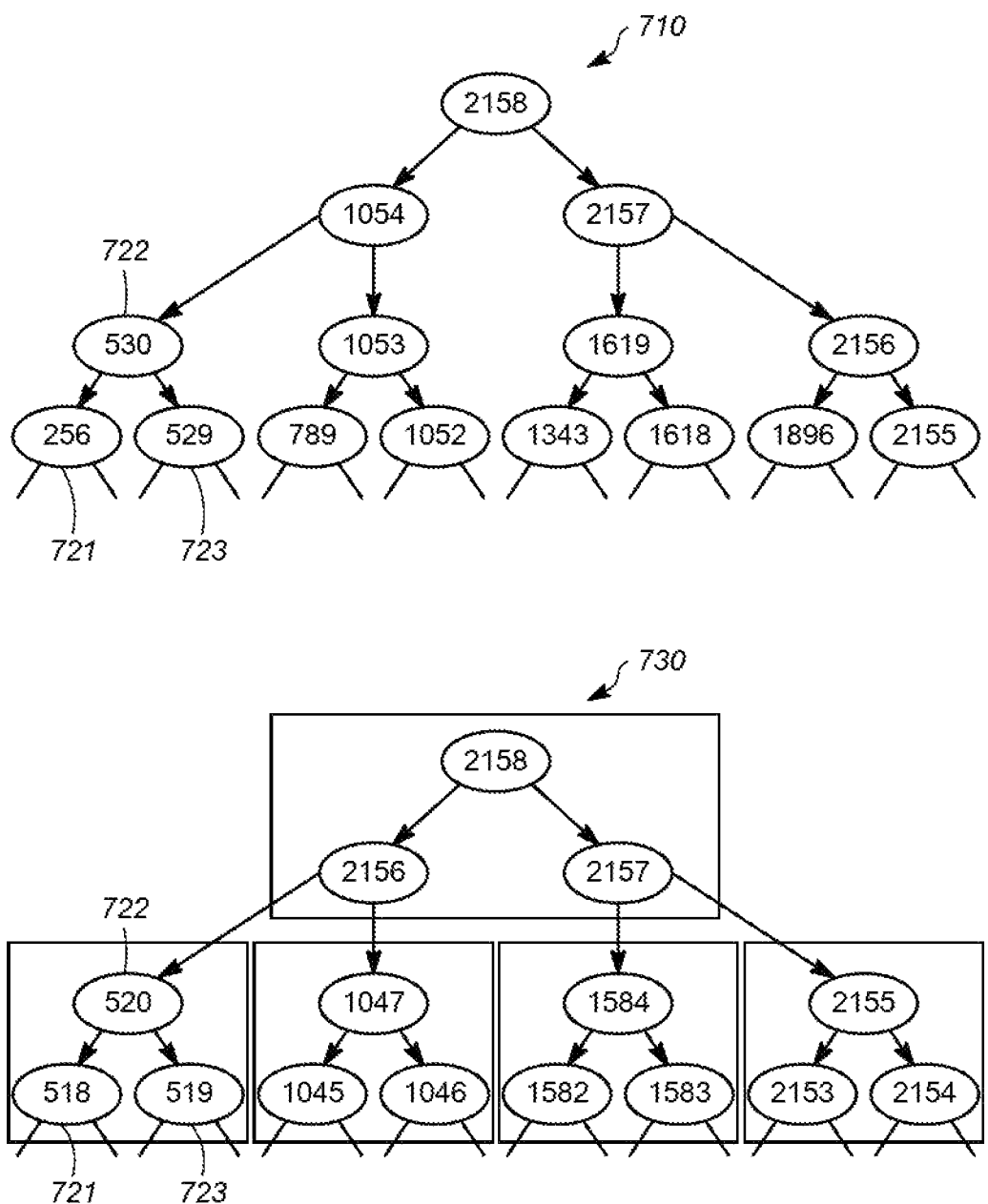
FIG. 7 illustrates an exemplary view of chunking a binary tree.

FIG. 7 illustrates one exemplary view of chunking in a binary tree. Tree 710 and tree 730 both show a top portion of one exemplary larger tree. In this example, the larger tree may contain 2158 nodes, have a chunk level that is two, and have an out-of-core page file size that encompass 64 nodes. However, the invention is not limited to this example and other chunk levels and/or out-of-core page file sizes may be used. The nodes in tree 710 are ordered without chunking, so the out-of-core assignments may appear to be random. For example, node 721 may be assigned to a different out-of-core storage device, page file, and the like than nodes 722-723. The nodes in tree 730 are ordered with chunking. Here, nodes 721-723 may be assigned to the same out-of-core storage device, page file, and the like.

Returning to FIG. 2, in step 260 of process 200, the nodes may be written to one or more out-of-core storage devices. In step 270 of process 200, the scene may be rendered. To shade a scene, once the octree is built, it may be used to efficiently compute close approximations to various global illumination integrals. Some examples of the global illumination integrals are one-bounce diffuse interreflections, ambient occlusion, high dynamic-range environment-map lighting, or the like. Each point may be shaded by performing a depth-first traversal of the octree and choosing a suitable level of detail.

For example, the shading may be based on a recursive octree cut-picking algorithm, which starts from the root and traverses down the tree, until a refinement criteria is satisfied. A cut-picking algorithm is an algorithm used to determine a subset of nodes of the octree for computing the integrals at a particular shading location. After the cut-picking algorithm has been applied, the clusters and points on the cut may then be used as the appropriate geometric representations of the scene for solving the integrals.

The PBGI shading system may see the octree nodes and points as two very large files (on the order of 20+ GB each) relative to the size of the computing system's memory. These files may be implicitly decomposed into out-of-core page files, which may be loaded lazily, e.g., one out-of-core page file at a time, and stored in a Least Recently Used (LRU) cache. The cache's capacity may be determined by the total memory budget allocated.

The images may be decomposed into small rectangular regions and stored in a shared work queue. In a parallel embodiment, processes ready to work may acquire the next region to be shaded from the shared work queue. During shading, all of the processes may traverse the octree and access the point and node caches simultaneously. Both caches may be stored in shared memory and may be protected by a mutex.

Since the caches may be accessed frequently, mutex contention may become a problem. Process local caches may be utilized on top of the shared caches. When a process requests an out-of-core page file, it may first look into its local cache. If the out-of-core page file is not found, the shared cache may be queried. The shared cache may directly provide the out-of-core page file, load it first from a disk, or the like. This cache may be a two-level LRU cache using multi-level inclusion. The two-level LRU cache may be utilized to scale to multiple processors. Reference counting may be used to deallocate pages that fall out from all of the caches.

Since the cut-picking algorithm may access more node data than point data, in one embodiment, ¾ of the memory budget may be allocated for the node cache, and ¼ for the point cache. Note that the node cache and the point cache need not be separate caches. For example, the node data and point data may be stored in a single shared cache. The proportion of memory budgeted for each section may be dynamically allocated, as needed. The first half of the memory budget may be allocated to the shared cache, and the other half may be divided equally amongst all of the local caches. Node pages may be 240 kB and may contain 2048 nodes each. Point pages may be 514 kB and may contain 65,000 points each. However, the invention is not limited to these examples and other divisions and/or sizes may be used.

Not all of the steps described in process 200 are necessary to practice an exemplary embodiment of the invention. For example, step 250 is optional; in such an embodiment, the points may be written to the one or more out-of-core storage devices sequentially instead of chunked. Additionally, the steps described in process 200 need not be performed sequentially as shown. For example, steps 210, 220, and 230 may be performed in parallel.

Further, additional steps may be included. For example, the point and node data structures may be compressed. 16-bit half-floats may be used to store the point normals and colors as well as the node cluster's spherical harmonic (SH) coefficients. SH lighting techniques involve replacing parts of standard lighting equations with spherical functions that have been projected into frequency space using the spherical harmonics as a basis. The SH techniques may produce highly realistic shading and shadowing with comparatively little overhead. Normals and color value ranges are well suited to this floating point representation, but the SH coefficients may need to be re-normalized prior to compression to prevent the coefficients from falling out of range. The normalization factor may be the upper bound of the cluster projected area for any direction, such as the area of a disk with radius equal to half of the node's voxel diagonal. This factor may be stored in a lookup table, indexed by the level in the octree at which the cluster resides. This form of compression may maintain enough accuracy at all levels of the octree to not introduce distinguishable artifacts.

Figure 8A:
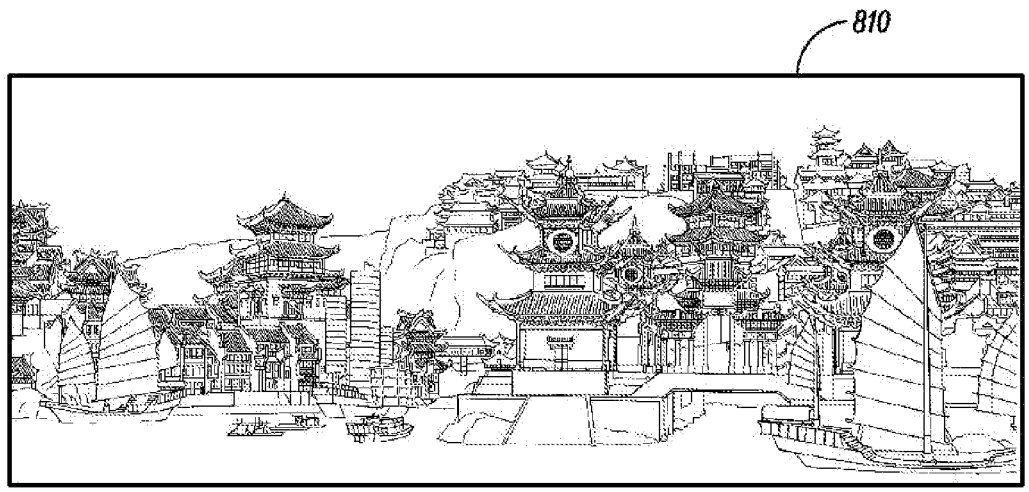
FIG. 8 illustrates an exemplary scene generated using out-of-core PBGI.
Figure 8B:
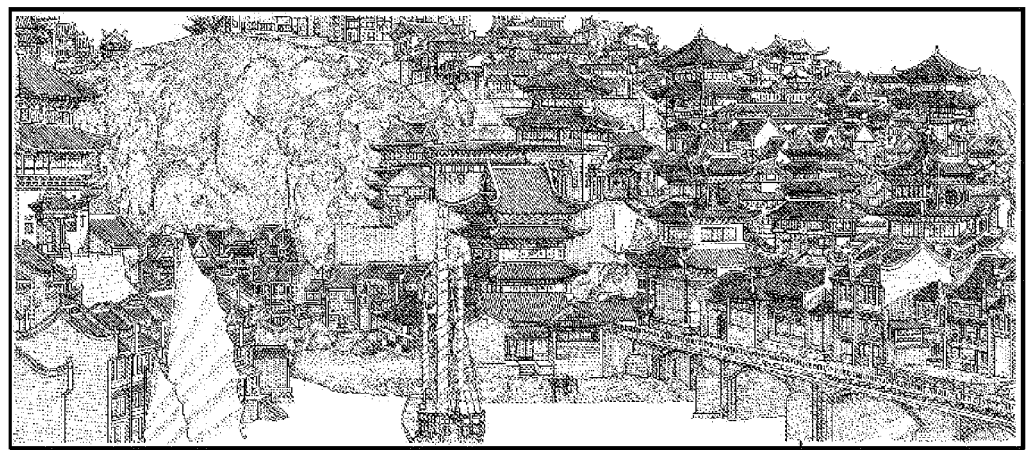

FIG. 8 illustrates exemplary scenes generated using out-of-core PBGI. In this example, the node data structure is 120 bytes and the point data structure is 32 bytes. All point and node indices are stored using 32-bit unsigned integers, which allows for 4.2 billion points and nodes. Increasing the bit length of the indices may produce larger node files and thus impact the I/O efficiency of the system. For scenes requiring more than 4.2 billion nodes, multiple levels of octrees (octrees of octrees) with independent 32-bit indices may be used.

Scenes 810 and 820 may be rendered on a HP Z800 workstation with a dual quad-core Intel Xeon CPU X5570 running at 2.93 GHz with 12 GB of memory. Scenes 810 and 820 may be rendered at 1920 by 816 resolution and shaded with 8 cores.

Scene 810 has 128.1 million points and scene 820 has 1.737 billion points. The performance of various production scenes is shown in Table 5. The time spent shading images with global illumination only ("Shading time") accounts for the time to compute irradiance using an out-of-core PBGI system and excludes other aspects of shading. This computation may be performed once per micropolygon in the image, as indicated by the number of "Shading calls". This cost of a single call may be directly proportional to the "Avg. cut size".

TABLE 5

Various statistics for 5 different rendered scenes

|  | Tree | Tighten | City 810 | City static 820 | Forest |
|---|---|---|---|---|---|
| Point count (millions) | 2.73 | 22.71 | 128.10 | 1736.74 | 927.07 |
| Node count (millions) | 0.65 | 5.24 | 27.45 | 328.77 | 203.73 |
| Shading calls (millions) | 1.24 | 1.61 | 3.21 | 4.39 | 18.81 |
| Point sort time (s) | 0.82 | 7.70 | 198.95 | 3094.74 | 1618.25 |
| Octree build time (s) | 0.92 | 7.79 | 59.81 | 1268.51 | 603.97 |
| Total build time (s) | 1.73 | 15.49 | 258.75 | 4363.25 | 2222.12 |
| Shading time (s) | 116 | 173 | 383 | 907 | 1459 |

TABLE 5-continued

Various statistics for 5 different rendered scenes

|  | Tree | Tighten | City 810 | City static 820 | Forest |
|---|---|---|---|---|---|
| Shading I/O time (%) | 0.01% | 0.03% | 1.93% | 2.11% | 7.00% |
| Out-of-core data (MB) | 158 | 1,292 | 7,051 | 90,625 | 51,607 |
| Cache peak RAM (MB) | 157 | 951 | 2,076 | 2,074 | 3,226 |
| Cache hit ratio | 99.99% | 99.99% | 99.97% | 99.96% | 99.97% |
| Cache I/O ratio | 99% | 74% | 60% | 11% | 48.50% |
| Avg. cut size | 1055 | 1230 | 1378 | 1902 | 857 |
| Avg. nodes traversed per cut | 1797 | 2122 | 2559 | 3487 | 1906 |
| Avg. traversal memory (MB) | 20.40 | 50.95 | 80.67 | 111.46 | 47.70 |

As can be seen in Table 5, the overhead of out-of-core PBGI during shading is small. The I/O time spent during shading ("Shading I/O time") varies roughly between 0.01% and 7%. Moreover, when out-of-core PBGI does not need to access the entire scene, it may be even faster than a fully in-core implementation. The "Cache I/O ratio" is the fraction of the out-of-core data that is paged in-core during shading. When this fraction is small, an out-of-core PBGI system may reduce I/O significantly compared to an in-core solution that must load the entire dataset. Rendering the scenes "Tree" and "Tighten" is 1.85 times and 1.23 times faster, respectively, compared to an in-core system. This speed benefit may be due to the improved memory coherence from chunking.

The memory budget devoted to the caches can be set low relative to the total data size, even in highly complex scenes, without seriously degrading performance. The lower bound for a reasonable memory budget may be determined by the size of the full cut of the octree required to shade a single pixel. If the cut does not fit in-core, the cache may start thrashing at every pixel, and shading may slow down excessively. An indicator for an acceptable memory budget may be the "Avg. traversal memory" listed in Table 5. It measures the average amount of memory needed to shade a single pixel. As shown in the table, these figures are small, and vary between 20 and 111 MB.

The statistics listed in Table 5 use the out-of-core octree construction with three levels of chunking. The shading time with three levels of chunking was 1.8 times faster than without chunking. In both cases, the build took 15 seconds. For scene 810 of FIG. 8, the speedup during final shading due to chunking was 4.4 times faster, and the build time was 4 minutes 18 seconds with chunking and 4 minutes 10 seconds without. In both scenes, the bulk of the speedup is due to highly reduced I/O during final shading. Using only two levels of chunking gave slightly less benefit than three, and using more than three levels did not noticeably improve performance. The build with chunking for all the scenes required at most 0.3 MB of extra in-core memory during the build, devoted to nodes residing in the node write-out queues.

Scalability was measured close to 7 times on 8 cores for smaller scenes, but slightly less when the size of the dataset and the amount of I/O increased. In one scene, the time is 7.2 times faster, in another scene 6.4 times faster, and in scene 810 of FIG. 8, it was 6.3 times faster when compared to shading with a single core.

A two-level LRU cache with multi-level inclusion may be used to reduce the expense of mutex locks. While a two-level cache is a common configuration in hardware, a separate first level cache per processor core may be used. Over-subscription to one local cache may force the eviction of other processes' entries from the second level cache, breaking the multi-level inclusion property. This may lead to situations where an out-of-core page file that already lives in one of the local caches may be reloaded because it cannot be found in the shared cache.

Figure 9:
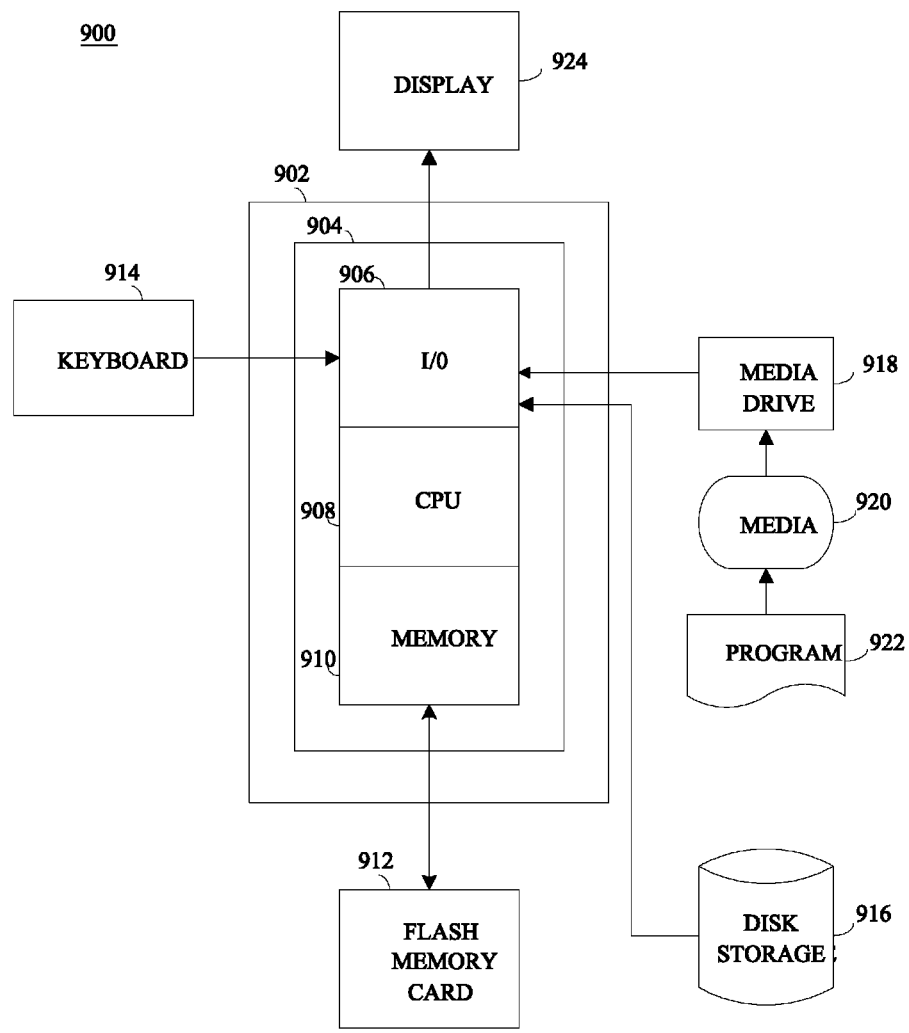
FIG. 9 illustrates an exemplary computing system.

FIG. 9 depicts an exemplary computing system 900 configured to perform any one of the above-described processes. In this context, computing system 900 may include, for example, a processor, memory, storage, and input/output devices (e.g., monitor, keyboard, disk drive, Internet connection, etc.). However, computing system 900 may include circuitry or other specialized hardware for carrying out some or all aspects of the processes. In some operational settings, computing system 900 may be configured as a system that includes one or more units, each of which is configured to carry out some aspects of the processes either in software, hardware, or some combination thereof.

FIG. 9 depicts computing system 900 with a number of components that may be used to perform the above-described processes. The main system 902 includes a motherboard 904 having an I/O section 906, one or more central processing units ("CPU") 908, and an in-core memory section 910, which may have a flash memory card 912 related to it. The I/O section 906 is connected to a display 924, a keyboard 914, an out-of-core disk storage unit 916, and a media drive unit 918. The media drive unit 918 can read/write a computer-readable medium 920, which can contain programs 922 and/or data.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A computer-enabled method of shading a scene, the scene comprising a shading location on a surface element of an object in the scene, the method performed by a computing system having an in-core memory and coupled to one or more out-of-core storage devices, the method comprising:
   generating a point cloud representation of the scene, wherein the point cloud representation of the scene is generated by dividing the surface of the object in the scene into one or more micropolygons and storing information for each micropolygon into a point of one or more points in the point cloud;
   generating an octree data structure based on the point cloud representation of the scene, wherein the octree structure comprises leaf nodes and parent nodes, and wherein the octree structure stores the one or more points in the point cloud representation of the scene as leaf nodes, and wherein the octree data structure stores cluster data in parent nodes, and wherein generating the octree data structure comprises:

computing Morton codes for each point in the point cloud representation of the scene, sorting the points based on a Morton order based on the computed Morton codes, recursively subdividing the points to find at most a threshold number of points, wherein the points are to be stored in nodes, and writing the nodes to the one or more out-of-core storage devices; and shading the shading location based on the nodes written to the one or more out-of-core storage devices.

2. The computer-enabled method of claim 1, wherein generating the octree data structure further comprises:

chunking the nodes before writing the nodes to the one or more out-of-core storage devices.

3. The computer-enabled method of claim 2, wherein chunking the nodes further comprises:

determining a maximum depth, and writing the nodes to a queue; and wherein writing the nodes to the one or more out-of-core storage devices further comprises:

writing the nodes to the one or more out-of-core storage devices from the queue at each maximum depth.

4. The computer-enabled method of claim 1, wherein sorting the points further comprises:

sorting based on an N-way merge sort.

5. The computer-enabled method of claim 1, wherein generating the octree data structure further comprises:

finalizing the nodes before writing the nodes to the one or more out-of-core storage devices.

6. The computer-enabled method of claim 5, wherein finalizing the nodes further comprises:

computing the cluster data of the nodes.

7. The computer-enabled method of claim 1, wherein the nodes comprise at most a threshold number of points.

8. The computer-enabled method of claim 1, wherein the nodes may be compressed.

9. The computer-enabled method of claim 1, wherein the one or more out-of-core storage devices comprise one or more hard disks, wherein the nodes may be written to one or more out-of-core page files.

10. A computer-enabled method of shading a scene, the scene comprising a shading location on a surface element of an object in the scene, the method performed by a computing system having an in-core memory and coupled to one or more out-of-core storage devices, the method comprising:

generating a point cloud representation of the scene, wherein the point cloud representation of the scene is generated by dividing the surface of the object in the scene into one or more micropolygons and storing information for each micropolygon into a point of one or more points in the point cloud;

generating an octree data structure based on the point cloud representation of the scene, wherein the octree structure comprises leaf nodes and parent nodes, and wherein generating the octree data structure comprises:

computing positions on a space filling curve for each of the one or more points in the point cloud representation of the scene, sorting the points based on the space filling curve, recursively subdividing the points to find at most a threshold number of points, wherein the points are to be stored in nodes, and writing the nodes to the one or more out-of-core storage devices; and shading the shading location based on the nodes written to the one or more out-of-core storage devices.

11. The computer-enabled method of claim 10, wherein the space filling curve is a Z-curve determined based on Morton order, wherein the Morton order is determined based on Morton codes.

12. A non-transitory computer-readable storage medium comprising computer-executable instructions for shading a scene, the scene comprising a shading location on a surface element of an object in the scene, the computer-executable instructions performed by a computing system having an in-core memory and coupled to one or more out-of-core storage devices, the computer-executable instructions comprising instructions for:

generating a point cloud representation of the scene, wherein the point cloud representation of the scene is generated by dividing the surface of the object in the scene into one or more micropolygons and storing information for each micropolygon into a point of one or more points in the point cloud;

generating an octree data structure based on the point cloud representation of the scene, wherein the octree structure comprises leaf nodes and parent nodes, and wherein generating the octree data structure comprises:

computing positions on a space filling curve for each of the one or more points in the point cloud representation of the scene, sorting the points based on the space filling curve, recursively subdividing the points to find at most a threshold number of points, wherein the points are to be stored in nodes, and writing the nodes to the one or more out-of-core storage devices; and shading the shading location based on the nodes written to the one or more out-of-core storage devices.

13. The non-transitory computer-readable storage medium of claim 12, wherein the space filling curve is a Z-curve determined based on Morton order, wherein the Morton order is determined based on Morton codes.

14. The non-transitory computer-readable storage medium of claim 12, wherein generating the octree data structure further comprises:

chunking the nodes before writing the nodes to the one or more out-of-core storage devices.

15. The non-transitory computer-readable storage medium of claim 14, wherein chunking the nodes further comprises:

determining a maximum depth, and writing the nodes to a queue; and wherein writing the nodes to the one or more out-of-core storage devices further comprises:

writing the nodes to the one or more out-of-core storage devices from the queue at each maximum depth.

16. The non-transitory computer-readable storage medium of claim 12, wherein sorting the points further comprises:

sorting based on an N-way merge sort.

17. The non-transitory computer-readable storage medium of claim 12, wherein generating the octree data structure further comprises:

finalizing the nodes before writing the nodes to the one or more out-of-core storage devices.

18. The non-transitory computer-readable storage medium of claim 17, wherein finalizing the nodes further comprises:

computing the cluster data of the nodes.

19. A computer system for shading a scene, the scene comprising a shading location on a surface element of an object in the scene, the computer system comprising:

in-core memory configured to store the shading location in the scene;

one or more out-of-core storage devices configured to store one or more points in a point cloud and nodes from an octree data structure; and one or more processors configured to:

generate a point cloud representation of the scene, wherein the point cloud representation of the scene is generated by dividing the surface of the object in the scene into one or more micropolygons and storing information for each micropolygon into a point of one or more points in the point cloud;

generate the octree data structure based on the point cloud representation of the scene, wherein the octree structure comprises leaf nodes and parent nodes, and wherein generating the octree data structure comprises:

computing positions on a space filling curve for each of the one or more points in the point cloud representation of the scene, sorting the points based on the space filling curve, recursively subdividing the points to find at most a threshold number of points, wherein the points are to be stored in nodes, and writing the nodes to the one or more out-of-core storage devices; and shade the shading location based on the nodes written to the one or more out-of-core storage devices.

20. The computer system of claim 19, wherein the space filling curve is a Z-curve determined based on Morton order, wherein the Morton order is determined based on Morton codes.

21. The computer system of claim 19, wherein the nodes comprise at most a threshold number of points.

22. The computer system of claim 19, wherein the nodes may be compressed.

23. The computer system of claim 19, wherein the one or more out-of-core storage devices comprise one or more hard disks, wherein the nodes may be written to one or more out-of-core page files.

* * * * *